United States Patent [19]

Strawson et al.

[11] 4,333,895

[45] Jun. 8, 1982

[54] APPARATUS FOR MOULDING MAGNET COMPACTS

[75] Inventors: Kenneth H. Strawson; Gerald Spencer, both of Sheffield, England

[73] Assignee: National Research Development Corp., London, England

[21] Appl. No.: 911,104

[22] Filed: May 31, 1978

[30] Foreign Application Priority Data

Aug. 1, 1977 [GB] United Kingdom ............... 32260/77

[51] Int. Cl.³ .............................................. B06B 1/02
[52] U.S. Cl. ......................................... 264/24; 264/86
[58] Field of Search ................................. 264/24, 86

[56] References Cited

U.S. PATENT DOCUMENTS

| | | | |
|---|---|---|---|
| 3,634,559 | 1/1972 | Haes | 264/86 |
| 3,755,515 | 8/1973 | Cochardt et al. | 264/24 |
| 3,958,908 | 5/1976 | Schubart | 264/86 |
| 3,989,777 | 11/1976 | Strawson et al. | 264/86 |

*Primary Examiner*—John A. Parrish

[57] ABSTRACT

A method of moulding magnet compacts in a die surrounded by an induced magnetic field, the die being surrounded by a mass of material having a high magnetic conductivity so that the induced magnetic field is non-linear through the die.

5 Claims, 8 Drawing Figures

APPARATUS FOR MOULDING MAGNET COMPACTS

The invention relates to apparatus for moulding permanent magnet compacts. In particular, the invention relates to apparatus including means for injecting a slurry material into a mould cavity from which excess water (or other liquid used in the preparation of the slurry) can escape through a filter, and means for maintaining a slurry pressure within the mould cavity sufficient to achieve a required density of finished compact. The primary object of the invention is to provide a method of and a machine for producing permanent magnet compacts by means of which a very high quality product can be obtained, at very high rates of production and at relatively low unit cost.

According to one aspect of the invention, there is provided a method of moulding magnet compacts in a compactable slurry material containing ferrite particles, the method including the step of filling, with a quantity of the slurry material, a die cavity formed in a die plate made from or including a mass of material having a high magnetic conductivity, and including the further step of producing an induced electro-magnetic field through the die plate so that by virtue of the presence of the mass of material of high magnetic conductivity the induced magnetic field is non-linear as it passes through the die cavity whereby a required orientation of the ferrite particles in the compactable slurry material is brought about. The method will preferably include the further step of bringing about filtration of the slurry material in the die cavity as a pressure is produced in said cavity, the direction in which fluid flow takes place through at least part of the filtration assisting the required orientation of the ferrite particles. It may include the further step of positioning within the die cavity at least one core piece made of a material having a high magnetic conductivity, whereby the required orientation of the ferrite particles in the compactable slurry material is facilitated.

According to a further aspect of the invention, there is provided apparatus for moulding magnet compacts in compactable slurry material containing ferrite particles, the apparatus including at least one die cavity formed within a die plate and means for producing an induced electromagnetic field through the die plate, the die plate either having an inserted mass within it of a material having a high magnetic conductivity or being made of a material of high magnetic conductivity, the location of the mass of material, or the shape of the die plate, as the case may be, in relation to the at least one die cavity being such that the induced magnetic field will be non-linear as it passes through said at least one die cavity and will conform substantially to a required non-linear magnetic field polarisation in magnet compacts which are to be produced in the apparatus. The apparatus may include a filter assembly adapted to form a closure member for said at least one cavity at one side of the die plate, and a die cover plate adapted to be brought into engagement with the opposite side of said die plate. The or each cavity may include filter means at radially inner and/or outer surfaces of the cavity so that a flow of water (or other liquid forming the slurry) therethrough tends to assist the required alignment of the particles of ferrite material in the slurry radially of the magnet compact being produced. The apparatus may include at least one core piece disposed within the or each die cavity, or arranged to be disposed within the or each die cavity during a moulding operation, the at least one core piece being made of a material of high magnetic conductivity whereby the required orientation of the ferrite particles in the compactable slurry material is facilitated.

In order that the invention may be fully understood and readily carried into effect, the same will now be described, by way of example only, with reference to the accompanying drawings, of which.

Figure 1:
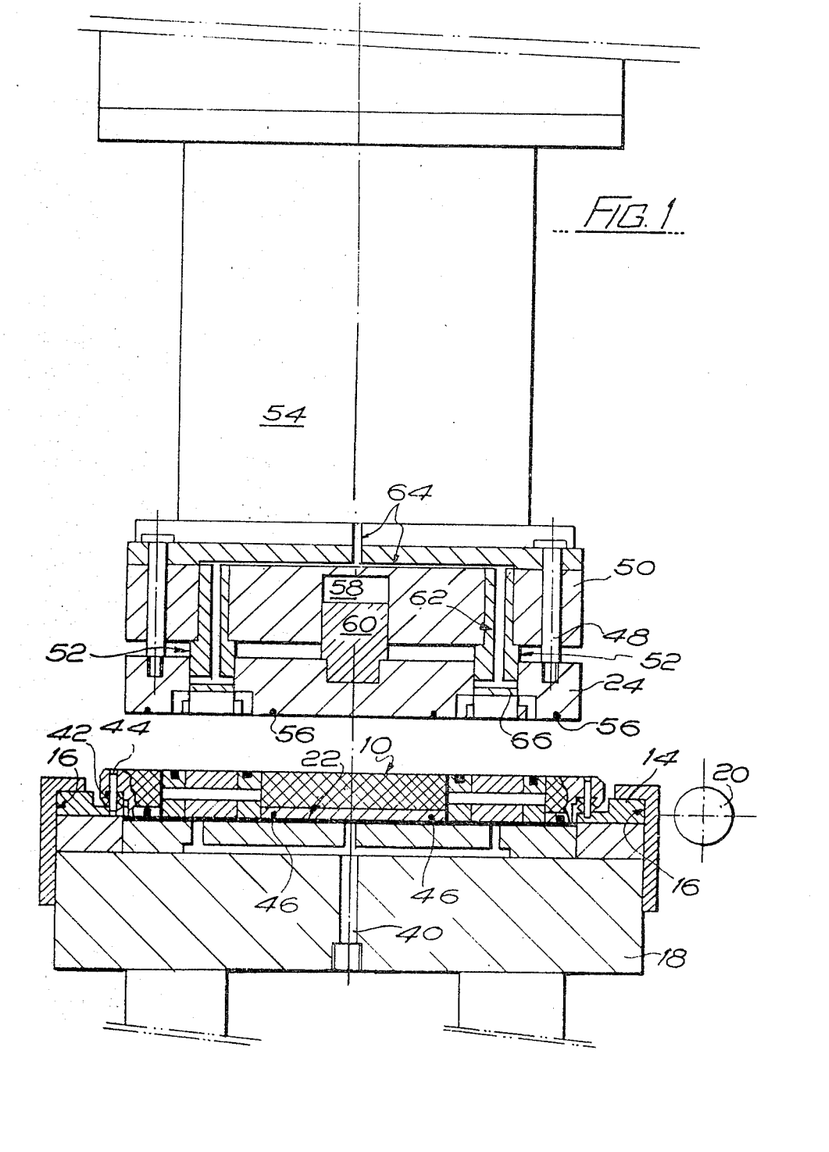
FIG. 1 is a semi-diagrammatic drawing which illustrates apparatus embodying the invention for the production of permanent magnet compacts in a magnetic slurry material and with non-linear magnetic field polarisation.

Referring now to the drawings, the apparatus there illustrated includes a die plate 10 (which is made of a non-magnetic material) provided with a number of cavities 120 (see FIGS. 6 and 7) in which respective moulded components are to be formed. The die plate is mounted on a die plate carriage 14 which is slidably mounted in guides 16 on a fixed frame part 18 of the machine. A hydraulic ram, indicated schematically at 20, is provided for moving the die plate and die plate carriage to and from the position in which it is shown in the drawing, that is to say in which the die plate overlies a filter block assembly, generally indicated 22, and is located beneath a die cover plate 24.

The filter block assembly 22 is not illustrated in detail. Suffice to say that it includes a filter block which generally corresponds in size and shape to the outline shape of the die plate, and a filter pad which overlies the filter block. A series of grooves extend across the top face of the filter block and communicate with a fluid flow passage 40 from which liquid percolating through the filter pad can flow freely at a certain stage in the operation of the apparatus as will presently be described.

It will be seen in FIG. 1, that the die plate, at the initial stage of operation of the machine, is suspended above the filter block assembly on stacks of Belleville spring washers 42 which are located on guide rods 44 upstanding from the die plate carriage. The die plate is located in position by, but slidably vertical on, the guide rods. The underside of the die plate is provided with resilient sealing elements 46 which surround the respective cavities 120, and when the die plate is downwardly displaced the sealing elements are pressed against the filter pad.

Figure 2:
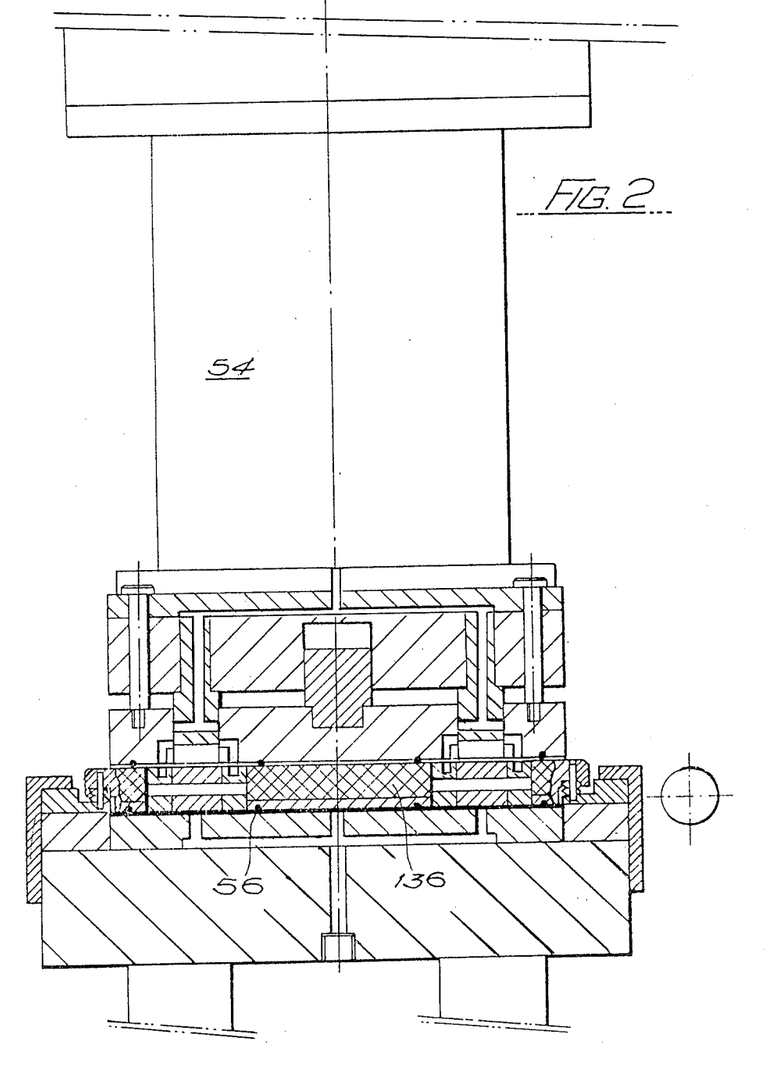
FIGS. 2 to 4 illustrate successive stages in the forming of a number of moulded components during the operation of the apparatus.
Figure 3:
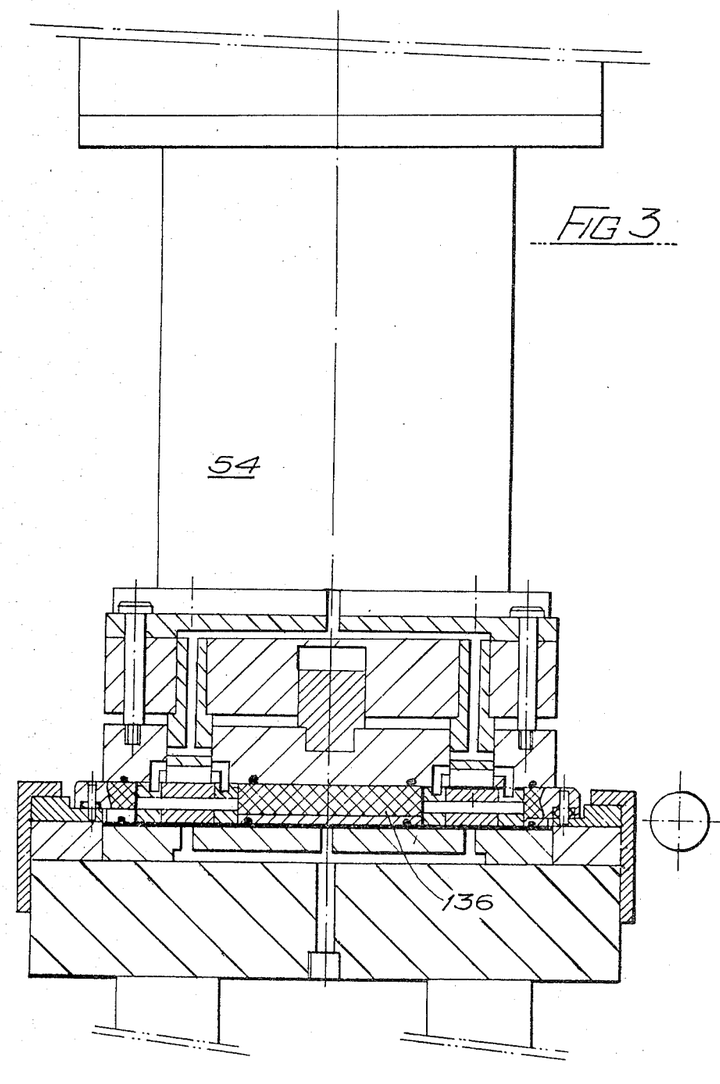

The die cover plate 24 is suspended on a plurality of headed guide pins 48 which extend slidably through a core plate/gallery plate assembly 50, and respective rods 52 are connected to the core plate/gallery plate assembly and extend into bores in the die cover plate. The core plate/gallery plate assembly is carried, for vertical movement, by a hydraulic ram assembly, generally indicated 54. Resilient sealing elements 56 are provided at the underside of the die cover plate and surround the bores through which the rods 52 extend, the arrangement being such that, as shown in FIG. 2, the sealing elements contact the top surface of the die plate when the hydraulic ram assembly is extended and the die cover plate is lowered onto the die plate, the upper ends of the cavities 120 being sealed thereby. Further downward movement of the core plate/gallery plate assembly causes the die plate to be pressed downwardly against the filter block assembly as the Belleville spring washers are compressed (see FIG. 3) and a still further downward movement of the core plate/gallery plate assembly causes the rods 52 to extend further into the die cover plate (see FIG. 4).

Figure 5:
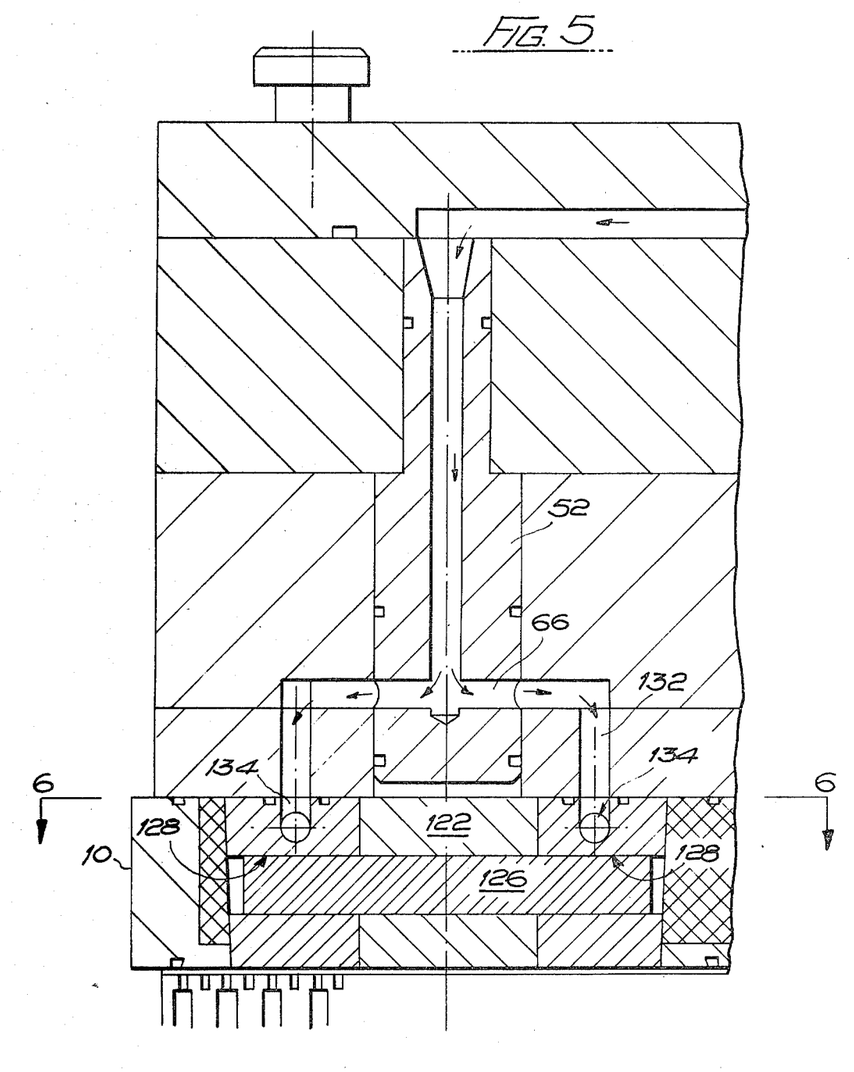
FIG. 5 is a part of the apparatus as shown in FIG. 4 but drawn to a somewhat larger scale.
Figure 6:
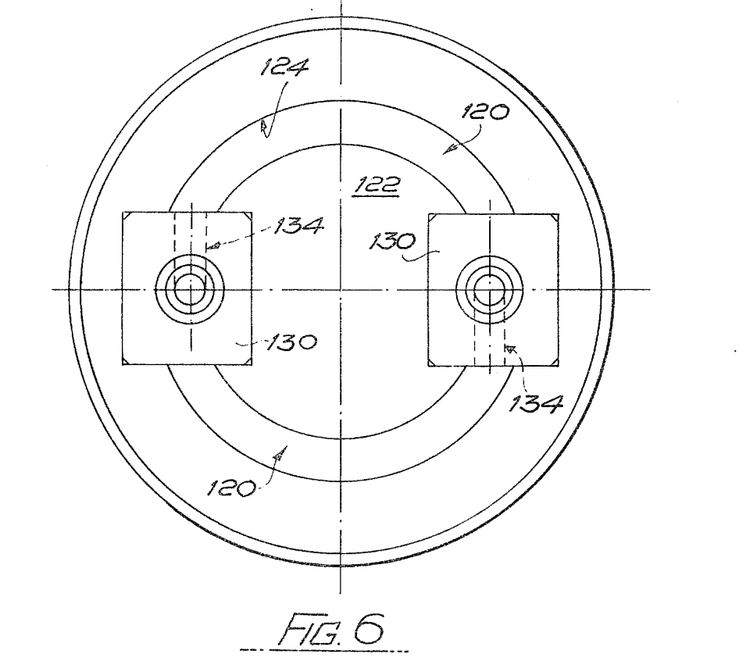
FIG. 6 is a plan view on the line 6—6 in FIG. 5.

Referring now to FIGS. 5 and 6, it can be seen that the moulded components which are to be formed in the die cavities have the form of curved segments, being formed in pairs of mould cavities 120 on opposite sides of respective fixed cores 122, the latter being suspended in position within cut-out apertures 124 in the die plate 10 by respective rods 126 which extend through the fixed cores and into aligned bores 128 in oppositely disposed inserts 130.

It will be observed that the rods 52 constitute cavity feeders, cross ports 55 of which are put in communication with feeder ports 132 extending through the die cover plate when the latter has been brought into overlying engagement with the die plate. Passages 134 extend through the inserts 130 and distribute the slurry material to the mould cavities 120 when the die cover plate has been brought into overlying engagement with the die plate and the core plate/gallery plate assembly has been lowered relative to the die cover plate to bring the cross ports of the cavity feeders into communication with the feeder ports 132.

Means are provided whereby the core plate and die cover plate can be urged apart to the maximum extent permitted by the guide pins 48, as shown in FIG. 1, said means being constituted by a centrally disposed cylinder 58 which is formed in the core plate and which accommodates a piston 60 in contact with the die cover plate, the arrangement being such that when a hydraulic pressure is ducted to said cylinder the die cover is urged downwardly with a controlled and constant pressure. Consequently, when the core plate is subsequently to be raised to its initial position it can be arranged that the rods 52 will be retracted so that the cross ports 66 are moved out of alignment with the feeder ports 132 before the die cover plate is raised.

Figure 4:
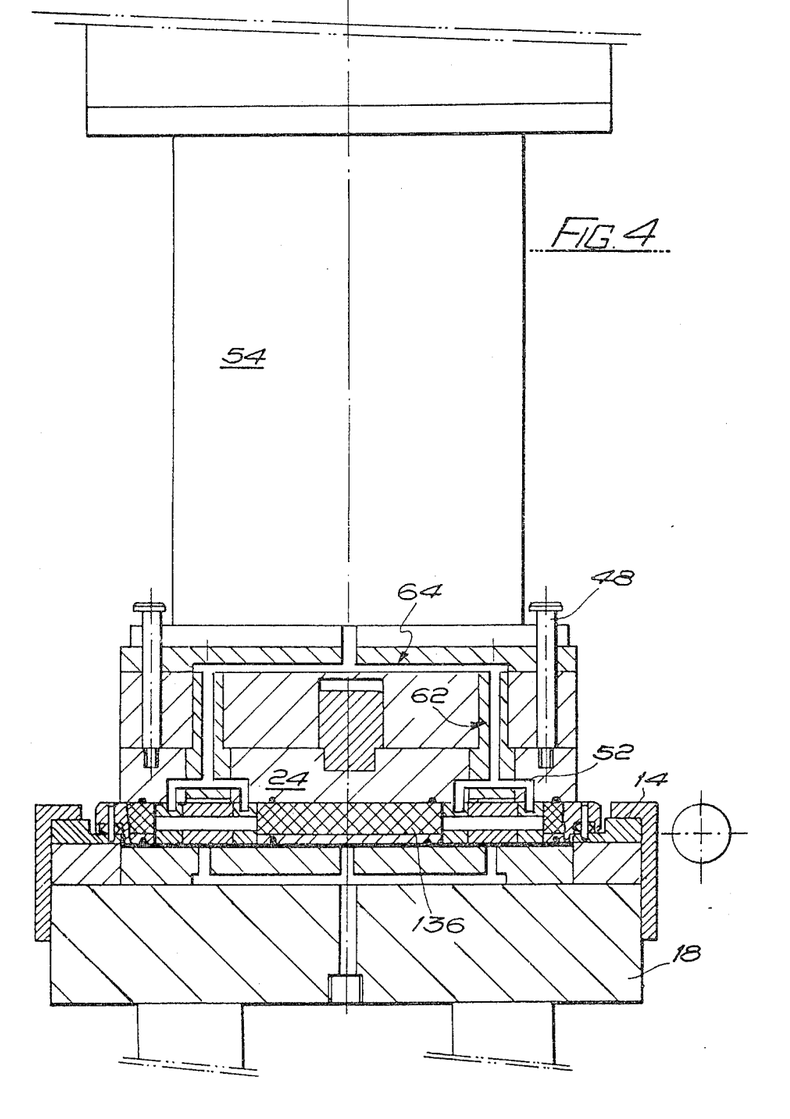

Means which are provided for ducting a compactable slurry material through the rods 52 to the cavities 120 of the die plate when the die has been closed include feed passages 62 which extend through the rods 52 from a common feed gallery 64 which has been formed at the core plate/gallery plate mating surfaces. The feed passages communicates with the respective cross ports 66 near the ends of said rods and the arrangement is such that when the rods have been retracted, as shown in FIG. 1, the ends of the cross ports are sealed, but when said rods have been extended, as shown in FIG. 4, they communicate with the feeder ports 132 for the supply of the slurry material to the cavities 120. A slurry pressure can be maintained in the die cavities for a predetermined period of time following their filling by the slurry material so that water (or other liquid used in the preparation of the slurry) is expelled through the filter assembly to produce compacts of material in the respective cavities in a required condition. (When the required condition of the compacts has been achieved, the material in at least the portion of the slurry feed passages nearest the cavities could be in the same de-watered or compacted condition but this is of no importance because these plugs of material will be injected into the die cavities during the next moulding operation and will immediately form a homogeneous mass with the slurry material entering the cavities behind them).

Figure 7:
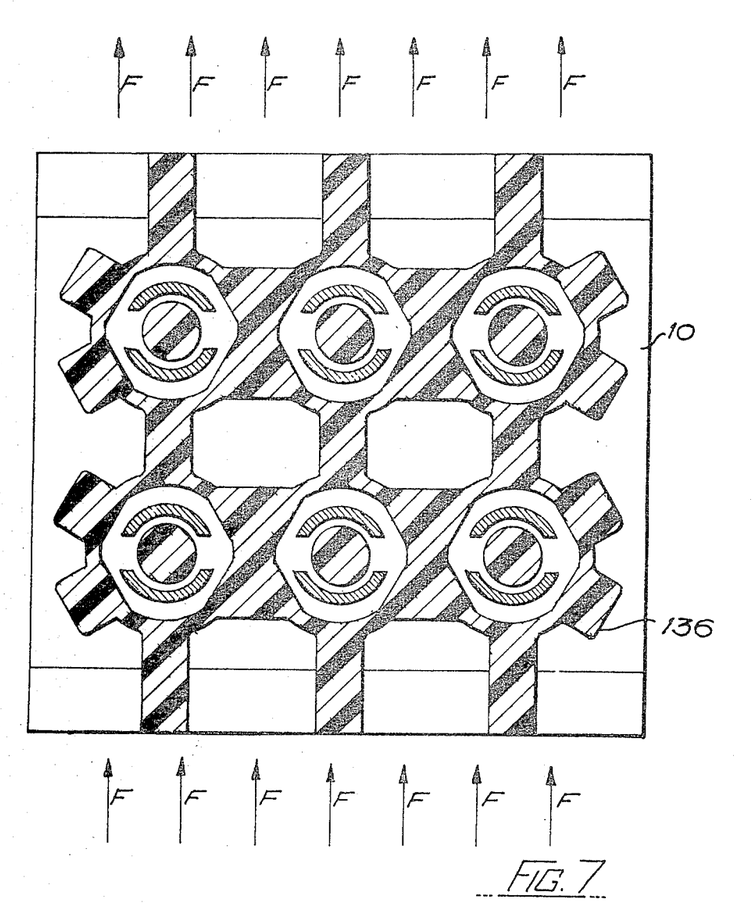
FIG. 7 is a view which illustrates the construction of a die plate forming part of the apparatus.
Figure 8:
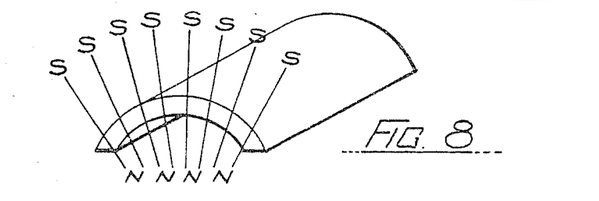
FIG. 8 is a perspective view of a permanent magnet compact which can be produced in the apparatus.

Referring now to FIG. 7, means (not shown) are provided for setting up an induced magnetic field around the die plate as the slurry pressure is maintained within the die cavities (the lines of force of the induced magnetic field being indicated F in FIG. 7) and in this way the particles of magnetic material in the slurry are acted upon and automatically adopt the polarisation of the magnetic field, i.e. they align themselves with the lines of force F, before and during the compacting process. However, it will be observed that there is an inserted mass 136, within the die plate, of a material having a high magnetic conductivity. The shape of this mass and its location in relation to the die cavities is such that the induced magnetic field is non-linear as it passes through the die cavities and conforms substantially to a required non-linear magnetic field polarisation in magnet compacts which are to be produced in the apparatus. (In FIG. 8 there is illustrated a magnet segment which has been made from a compact of material produced in the apparatus, the segment being shown to have radiating polarity). In other words it will be seen that the mass of material 136 within the otherwise non-magnetic die plate "bends" the lines of force F to bring about a required polarity in the compacts.

It will be seen that the inserted mass of the material having a high magnetic conductivity is of an irregular shape and thickness around the die cavities and it will be understood that this is so that the lines of force F are "bent" as required. The required shape and thickness of the mass of material may of course be determined by trial and experiment and will be dependent on the degree of magnetic conductivity of the material used.

The high magnetic material used may be ferrous metal in which case it may be in the form of inserts placed in position in the die plate or it may have been cast into contoured recesses machined in the die plate. On the other hand the high magnetic material used may be rare earth cobalt particles encapsulated in epoxy resin and run into shaped recesses in the die plate. A further possibility is that ferrite particles in powder or slurry form could be moulded and sintered in the recesses in the die plate. It will be understood that it will be preferable for the mass of material having high magnetic conductivity to extend through the full depth or virtually the full depth of the die plate (or to extend across the full thickness of the magnet compact or compacts to be produced) but for purposes of illustration it will be seen that in the drawings the mass of material 136 is shown to extend through about three quarters of the thickness of the die plate. The non-magnetic die plate body may be made of non-ferrous metal.

The production of moulded components in a compactable material in the manner described above is advantageous in a number of respects. For example, the fact that a compact can be produced having radiating polarity instead of linear polarity as hitherto has been found to result in better performance of the electric motors in which the finished magnets have been used. In addition, the apparatus makes use of a substantially constant horsepower system in that at the commencement of die filling the available hydraulic power is absorbed in high slurry flow velocities but as the pressure of the slurry builds up within the die the rate of flow decreases and the available hydraulic horsepower is absorbed in generating high pressure. A further advantage is that the initial consistency of the slurry which is mixed for use in the machine is not critical and if a thinner consistency is used the constant horsepower feature referred to automatically compensates for this by increasing the initial slurry flow rate into the die so that total cycle time is maintained substantially constant. The fact that the compacts of material are produced in fixed capacity moulds results in the production of compacts which from each die cavity are virtually identical one to another in size, shape and volume. It will of course be understood that it is not essential for all the die cavities to be alike and indeed a set of different components may be produced during each moulding operation.

The apparatus is capable of very high rates of production and down time is reduced to a minimum by virtue of the fact that the filter pad can very easily be replaced by the machine operator when it becomes clogged to such an extent that production rates are being effected.

Various modifications may be made without departing from the scope of the invention. For example, the die plate may be provided with any number of cavities from one upwards. The thickness of the die plate will of course also be varied to suit the depth of the moulded components required. Furthermore, the fixed cores 122 could also be made of a material having a high magnetic conductivity to further affect the induced electro-magnetic field (or could be provided with a hollow interior containing such a mass of material, as shown diagrammatically in FIG. 7). Alternatively, such cores could be secured beneath the die cover plate and be arranged to be disposed within the die cavities of the die plate when the cover plate has been brought into overlying engagement with said die plate. It will also be understood that the piston 60 slidable in the cylinder 58 could be replaced by a coil compression spring, although it is thought that a spring would not be quite so satisfactory because it would exert a variable force whereas a piston can exert a constant force dependent on the fluid pressure behind it.

The die cavities may be shaped to produce product configurations other than those illustrated. Furthermore, filter means may be provided in the die cover plate for example, such filter means being either additional to or instead of the filter block assembly 22. Indeed, it would be particularly advantageous for the filter means to be incorporated at the radially inner and/or radially outer surfaces of the die cavities so that the flow of water (or other liquid used in the preparation of the slurry) therethrough would tend to assist the required alignment of the particles of ferrite material in the slurry radially of the magnet compacts being produced. The materials of which the various other parts of the machine are made will be selected with due regard to the fact that a magnetic field is to be maintained around the die cavities as the slurry is injected into them and/or during the compacting process, and also with due regard to the fact that the particles of material need to be de-magnetised before the compacts are removed from the die plate.

It will be understood that instead of the die plate being made of a non-magnetic material and having an inserted mass within it of a material having a high magnetic conductivity, the die plate itself could be made of a material having a high magnetic conductivity but in this case would be so shaped that the greater mass of material was concentrated so as to produce the non-linear lines of force of the induced magnet field. Various other modifications could be made. For example, the die plate could be made of at least two separable parts so that after each moulding operation the said at least two parts could be separated to allow the release of at least one compact of material having a shape preventing its release from the assembled die plate.

Means constituting a pressure intensifier may be associated with the hydraulic ram assembly 54 for feeding the compactable slurry material under pressure to the die cavities. On the other hand, such means could conceivably be constituted be electro magnetic means producing an induction effect within a slurry flow line.

What we claim and desired to secure by Letters Patent is:

1. A method of producing molded magnet compacts from a compactable slurry containing ferrite particles comprising the steps of providing a mold having fixable die plates and a mass of material having a high magnetic conductivity and a predetermined configuration and disposition relative to said die plates, fixing said plates relative to each other to define a die cavity of predetermined configuration and fixed volume, filling said die cavity with said slurry under a hydraulic pressure sufficient to compact said slurry therein, producing an induced electro-magnetic field through said die plates said field being transverse to the press axis of the mold, whereby said induced magnetic field passes non-linearly through said die cavity so that in cooperation with said mass, the ferrite particles within the slurry are oriented in a predetermined polar direction.

2. A method according to claim 1, wherein the slurry is filtered during said filling, the direction in which fluid flow takes place through at least part of said filtration being substantially parallel to the direction of orientation of said ferrite particles.

3. A method according to claim 1, including positioning at least one core of said mass having a high magnetic conductivity within said die cavity prior to inducing said electromagnetic field in order to facilitate orientation of said ferrite particles.

4. A method according to claim 1, wherein the mold is filled in a direction transverse to the induced magnetic field.

5. A method according to claim 1, including positioning said mass of magnetically conductive material exteriorly around each of said die cavities.

* * * * *